United States Patent

Ell (10) Patent No.: US 10,101,174 B2
(45) Date of Patent: Oct. 16, 2018

(54) AIR DATA AIDED INERTIAL MEASUREMENT UNIT

(71) Applicant: Rosemount Aerospace Inc., Burnsville, MN (US)

(72) Inventor: Todd Ell, Savage, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 101 days.

(21) Appl. No.: 15/243,455

(22) Filed: Aug. 22, 2016

(65) Prior Publication Data

US 2018/0052006 A1 Feb. 22, 2018

(51) Int. Cl.
  *G01P 5/00* (2006.01)
  *G01P 21/00* (2006.01)
  *G01C 21/00* (2006.01)
  *G01C 25/00* (2006.01)
  *G01C 21/16* (2006.01)

(52) U.S. Cl.
  CPC ............. *G01C 25/00* (2013.01); *G01C 21/16* (2013.01); *G01P 5/00* (2013.01); *G01P 21/00* (2013.01)

(58) Field of Classification Search
  CPC ........... G01P 5/00; G01P 21/00; G01C 25/00; G01C 21/00; G01C 21/16
  See application file for complete search history.

(56) References Cited

U.S. PATENT DOCUMENTS

| | | | |
|---|---|---|---|
| 4,303,978 A | 12/1981 | Shaw et al. | |
| 5,297,052 A | 3/1994 | McIntyre et al. | |
| 5,527,003 A | 6/1996 | Diesel et al. | |
| 7,418,364 B1 | 8/2008 | Horton et al. | |
| 7,873,472 B2 | 1/2011 | Zeng et al. | |
| 8,024,119 B2 | 9/2011 | Zeng et al. | |
| 8,447,446 B2 | 5/2013 | Puig et al. | |
| 8,583,371 B1 | 11/2013 | Goodzeit et al. | |
| 9,207,079 B2 * | 12/2015 | Askarpour | G01C 17/38 |
| 2016/0102994 A1 | 4/2016 | Brenner et al. | |
| 2016/0107761 A1 | 4/2016 | Ahlbrecht et al. | |
| 2016/0334219 A1 * | 11/2016 | Askarpour | G01C 17/38 |
| 2017/0227566 A1 * | 8/2017 | Gregory | G01C 19/5776 |

OTHER PUBLICATIONS

Extended European Search Report for European Patent Application No. 18157688.5, dated Aug. 22, 2018, 6 pages.

* cited by examiner

*Primary Examiner* — Bryan Bui
(74) *Attorney, Agent, or Firm* — Kinney & Lange, P.A.

(57) ABSTRACT

An inertial measurement unit (IMU) includes an inertial sensor assembly including a plurality of accelerometers and a plurality of rate gyroscopes, an inertial sensor compensation and correction module, and a Kalman estimator module. The inertial sensor compensation and correction module is configured to apply a set of error compensation values to sensed acceleration and rotational rate to produce a compensated acceleration and a compensated rotational rate of the IMU. The Kalman estimator module is configured to determine a set of error correction values based on a difference between a change in integrated acceleration of the IMU and a change in true airspeed of the IMU. The inertial sensor compensation and correction module is further configured to apply the set of error correction values to each of the compensated acceleration and the compensated rotational rate to output an error-corrected acceleration and an error-corrected rotation rate.

18 Claims, 5 Drawing Sheets

Fig. 5

AIR DATA AIDED INERTIAL MEASUREMENT UNIT

BACKGROUND

This disclosure relates generally to inertial measurement units, and more particularly to inertial measurement units that utilize air data parameters to produce error-compensated output values.

Many complex vehicle guidance systems, such as aircraft inertial navigation systems, utilize an inertial measurement unit (IMU) that senses and outputs current acceleration forces experienced by the IMU as well as changes in rotational position (e.g., roll, pitch, and yaw). Such IMUs typically sense the current acceleration in three dimensions via a triad of accelerometers, each oriented along one of three mutually-orthogonal axes. Similarly, changes in rotational position are typically sensed via a triad of gyroscopes, each oriented along one of the three mutually-orthogonal axes.

Outputs of the IMU (e.g., a three-axis acceleration vector as well as a three-axis vector representing changes in rotational speed) are often integrated over time by an inertial navigation system to arrive at a position and orientation of the vehicle relative to a known starting position and orientation via, e.g., dead reckoning techniques. However, such integration techniques can compound sensor errors over time. Some sensor errors, such as those due to temperature, can be considered deterministic in nature, and therefore compensated for in the integration techniques via pre-defined correction factors. Other errors, such as turn-on to turn-on biases and scale factor errors can be unpredictable or stochastic in nature, thereby preventing the use of such pre-defined correction factors for effective error compensation operations. The use of a fiber optic gyroscope (FOG) or ring laser gyroscope (RLG) can provide greater accuracy and consistency of measurements than, e.g., micro-electro-mechanical system sensors, but at significant added cost. Accordingly, accuracy of measurement is typically sacrificed for the benefit of reduced cost when utilizing MEMS sensors for measuring acceleration forces and rotational position changes in IMUs.

SUMMARY

In one example, an inertial measurement unit includes an inertial sensor assembly, an inertial sensor compensation and correction module, and a Kalman estimator module. The inertial sensor assembly includes a plurality of accelerometers and a plurality of rate gyroscopes. Each of the plurality of accelerometers is configured to sense acceleration of the IMU along one of a plurality of axes. Each of the plurality of rate gyroscopes is configured to sense rotational rate of the IMU along one of the plurality of axes. The inertial sensor compensation and correction module is configured to apply a set of error compensation values to acceleration sensed by the plurality of accelerometers and to rotational rate sensed by the plurality of rate gyroscopes to produce a compensated acceleration and a compensated rotational rate of the IMU. The Kalman estimator module is configured to determine a change in integrated acceleration of the IMU over a time interval based on the compensated acceleration and the compensated rotational rate of the IMU, determine a set of error correction values based on a difference between the change in the integrated acceleration of the IMU and a change in true airspeed of the IMU, and provide the set of error correction values to the inertial sensor compensation and correction module. The inertial sensor compensation and correction module is further configured to apply the set of error correction values to each of the compensated acceleration and the compensated rotational rate to produce an error-corrected acceleration and an error-corrected rotation rate, and output the error-corrected acceleration and the error-corrected rotational rate.

In another example, a method includes sensing acceleration of an inertial measurement unit (IMU) along a plurality of axes via a plurality of accelerometers of the IMU, and sensing rotational rate of the IMU along the plurality of axes via a plurality of rate gyroscopes of the IMU. The method further includes applying a set of error compensation values to each of the sensed acceleration and the sensed rotational rate to produce a compensated acceleration and a compensated rotational rate of the IMU, determining a change in integrated acceleration of the IMU over a time interval based on the compensated acceleration and the compensated rotational rate of the IMU, and determining a set of error correction values based on a difference between the change in the integrated acceleration of the IMU and a change in true airspeed of the IMU. The method further includes applying the set of error correction values to each of the compensated acceleration and the compensated rotational rate to produce an error-corrected acceleration and an error-corrected rotational rate, and outputting the error-corrected acceleration and the error-corrected rotational rate.

DETAILED DESCRIPTION

As described herein, an inertial measurement unit (IMU) utilizes air data parameter values, such as true airspeed and angle of attack, to produce error-corrected angular rate and acceleration output values. The IMU determines vehicle attitude parameters based on sensed acceleration and rotational position information received from accelerometers and gyroscopes of the IMU. Air data parameter values received and/or calculated by the IMU are utilized to estimate bias and/or scale factor errors of the accelerometer and gyroscope outputs. The IMU removes the estimated errors from the sensed angular rate and acceleration parameters to produce error-corrected output values, thereby increasing an accuracy of the IMU outputs.

Figure 1:
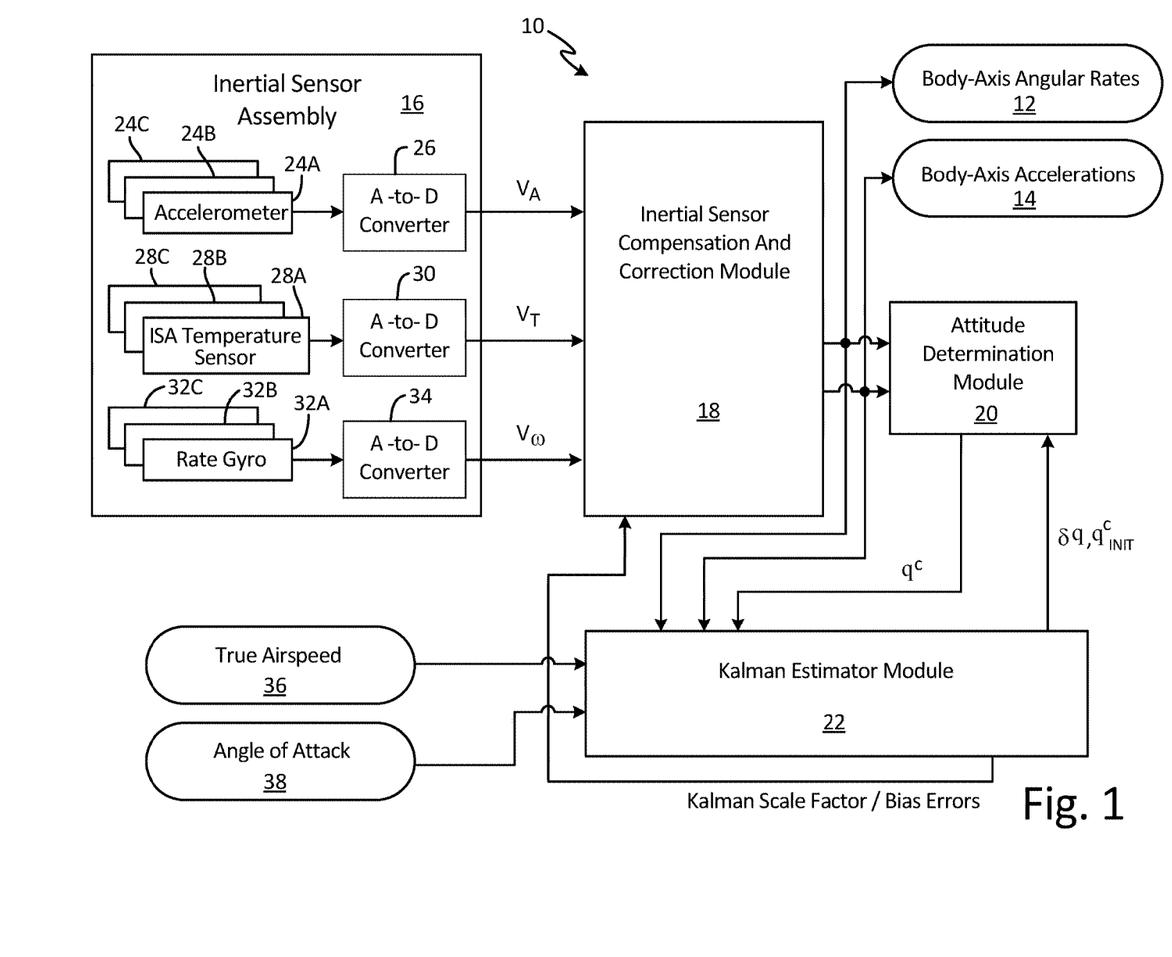
FIG. 1 is a schematic block diagram illustrating an example inertial measurement unit (IMU) that utilizes air data inputs to produce error-corrected acceleration and angular rate outputs.

FIG. 1 is a schematic block diagram illustrating inertial measurement unit (IMU) 10 that utilizes air data inputs to produce error-corrected body-axis accelerations 12 and body-axis angular rates 14. As illustrated in FIG. 1, IMU 10 includes inertial sensor assembly 16, inertial sensor compensation and correction module 18, attitude determination module 20, and Kalman estimator module 22. Inertial sensor assembly 16 includes accelerometers 24A, 24B, and 24C, analog-to-digital converter 26, temperature sensors 28A, 28B, and 28C, analog-to-digital converter 30, rate gyroscopes 32A, 32B, and 32C, and analog-to-digital converter 34. As further illustrated, IMU 10 receives true airspeed 36 and angle of attack 38 as inputs, and produces body-axis angular rates 12 and body-axis accelerations 14 as outputs. In other examples, rather than receive true airspeed 36 and angle of attack 38 as inputs, IMU 10 can receive sensor measurements, such as static pressure measurements, total pressure measurements, total air temperature measurements, or other sensor measurements that are usable by IMU 10 to derive true airspeed 36 and angle of attack 38. Body-axis angular rates 12 and body-axis accelerations 14 output from IMU 10 can be utilized by, e.g., an inertial navigation system of an aircraft or other moving body to which IMU 10 is mounted.

Accelerometers 24A, 24B, and 24C of inertial sensor assembly 16 form a 3-axis triad of accelerometers, each mounted (e.g., on a circuit board) and aligned to sense acceleration forces along one of three mutually-orthogonal axes. Rate gyroscopes 32A, 32B, and 32C are similarly mounted (e.g., on the same circuit board) and aligned to sense a rotational rate along one of three mutually-orthogonal axes (e.g., roll rate, pitch rate, and yaw rate). Temperature sensors 28A, 28B, and 28C are mounted (e.g., on the same circuit board) proximate accelerometers 24A-24C and rate gyroscopes 32A-32C to sense a temperature of an operational environment within inertial sensor assembly 16. For instance, temperature sensor 28A can be mounted proximate accelerometer 24A and rate gyroscope 32A to sense a temperature of an operational environment within inertial sensor assembly 16 proximate accelerometer 24A and rate gyroscope 32A. Temperature sensor 28B can be mounted proximate accelerometer 24B and rate gyroscope 32B to sense a temperature of an operational environment within inertial sensor assembly 16 proximate accelerometer 24B and rate gyroscope 32B. Temperature sensor 28C can be mounted proximate accelerometer 24C and rate gyroscope 32C to sense a temperature of an operational environment within inertial sensor assembly 16 proximate accelerometer 24C and rate gyroscope 32C. Any one or more of accelerometers 24A-24B, temperature sensors 28A-28C, and rate gyroscopes 32A-32C can be implemented as micro-electromechanical systems (MEMS).

As illustrated, inertial sensor assembly 16 further includes analog-to-digital (A-to-D) converters 26, 30, and 34. Each of A-to-D converters 26, 30, and 34 includes discrete and/or integrated logic circuitry to convert an analog signal input, such as a voltage, to a digital numerical representation proportional to a magnitude of the analog signal input. In operation, A-to-D converter 26 converts a voltage output from each of accelerometers 24A-24C to a digital numerical representation proportional to a magnitude of the voltage output from the respective one of accelerometers 24A-24C. A-to-D converter 30 converts a voltage output from each of temperature sensors 28A-28C to a digital numerical representation proportional to a magnitude of the voltage output from the respective one of temperature sensors 28A-28C. A-to-D converter 34 converts a voltage output from each of rate gyroscopes 32A-32C to a digital numerical representation proportional to a magnitude of the voltage output from the respective one or rate gyroscopes 32A-32C.

Each of inertial sensor compensation and correction module 18, attitude determination module 20, and Kalman estimator module 22 can be implemented in hardware, software, or combinations of hardware and software. For example, IMU 10 can include one or more processors and computer-readable memory encoded with instructions that, when executed by the one or more processors, cause IMU 10 to operate in accordance with techniques described herein. Examples of the one or more processors include any one or more of a microprocessor, a controller, a digital signal processor (DSP), an application specific integrated circuit (ASIC), a field-programmable gate array (FPGA), or other equivalent discrete or integrated logic circuitry. Computer-readable memory of IMU 10 can be configured to store information within IMU 10 during operation. The computer-readable memory can be described, in some examples, as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). Computer-readable memory of IMU 10 can include volatile and non-volatile memories. Examples of volatile memories can include random access memories (RAM), dynamic random access memories (DRAM), static random access memories (SRAM), and other forms of volatile memories Examples of non-volatile memories can include magnetic hard discs, optical discs, floppy discs, flash memories, or forms of electrically programmable memories (EPROM) or electrically erasable and programmable (EEPROM) memories.

As illustrated in FIG. 1, the outputs of A-to-D converter 26, A-to-D converter 30, and A-to-D converter 34 are provided as inputs to inertial sensor compensation and correction module 18, which also receives Kalman scale factor and bias error corrections from Kalman estimator module 22. Inertial sensor compensation and correction module 18 outputs body-axis angular rates 12 and body-axis accelerations 14 (i.e., error-corrected output values) via, e.g., a data bus or other communicative connection for use by an inertial navigation system or other consuming system. Body-axis angular rates 12 and body-axis accelerations 14 are also provided to attitude determination module 20 and Kalman estimator module 22 as inputs. Attitude determination module 20 further receives tilt error correction values δq and initial attitude quaternion $q^C_{init}$ from Kalman estimator module 22 and provides attitude information outputs to Kalman estimator module 22 in the form of attitude quaternion $q^C$. Kalman estimator module 22 further receives true airspeed 36 and angle of attack 38 from, e.g., an aircraft air data system, and provides Kalman scale factor and bias error corrections to inertial sensor compensation and correction module 18 for use in modifying inputs received from accelerometers 24A-24C and rate gyroscopes 32A-32C to produce error-corrected outputs body-axis angular rates 12 and body-axis accelerations 14, as is further described below.

In operation, accelerometers 24A-24C and rate gyroscopes 32A-32C sense acceleration forces and rotational rates along the three mutually-orthogonal axes. Temperature sensors 28A-28C sense a temperature of an operational environment of accelerometers 24A-24C and rate gyroscopes 32A-32C, for example on one or more circuit boards within a housing of IMU 10 that encloses components of IMU 10. The outputs of each of accelerometers 24A-24C, temperature sensors 28A-28C, and rate gyroscopes 32A-32C are provided to inertial sensor compensation and correction module 18 via A-to-D converters 26, 30, and 34, illustrated in FIG. 1 as $V_A$, $V_T$, and $V_\omega$. That is, $V_A$ represents a three-dimensional vector, each element of the vector corresponding to the output from one of accelerometers 24A, 24B, and 24C. Similarly, $V_T$ represents a three-dimensional vector, each element corresponding to the output from one of temperature sensors 28A, 28B, and 28C. $V_\omega$ also represents a three-dimensional vector, each element of the vector corresponding to the output from one of rate gyroscopes 32A, 32B, and 32C.

Inertial sensor compensation and correction module 18 applies compensation and correction factors to adjust each of the inputs $V_A$, $V_T$, and $V_\omega$ to produce body-axis angular rates 12 and body-axis accelerations 14. Body-axis angular rates 12 and body-axis accelerations 12 each represent three-axis outputs of error-compensated and error-corrected output values corresponding to the adjusted inputs $V_A$, $V_T$, and $V_\omega$. As is further described below, inertial sensor compensation and correction module 18 applies compensation and correction factors to inputs $V_A$, $V_T$, and $V_\omega$ to adjust inputs $V_A$, $V_T$, and $V_\omega$ to compensate for sensor scale factor errors corresponding to an error in the slope of the sensor output over a temperature range, bias errors corresponding to a non-zero offset in the sensor output over the temperature range, non-linearity errors corresponding to non-linearity of the sensor output over the temperature range, and non-orthogonality errors corresponding to offsets in the mutual-orthogonality of the sensor installations along the three axes within inertial sensor assembly 16. Such temperature-dependent scale factor errors, temperature-dependent bias errors, non-linearity errors, and non-orthogonality errors can be considered deterministic in nature. As such, compensation and correction factors applied by inertial sensor compensation and correction module 18 to compensate sensor inputs $V_A$, $V_T$, and $V_\omega$ for the deterministic errors can be pre-determined during, e.g., a testing phase in a laboratory or manufacturing facility and stored in computer-readable memory of IMU 10 for use by inertial sensor compensation and correction module 18 during operation.

Accordingly, inertial sensor compensation and correction module 18 applies compensation and correction factors to adjust sensor inputs $V_A$, $V_T$ and $V_\omega$ to compensate for deterministic errors, such as temperature dependent errors and sensor installation position and alignment errors. In addition, as illustrated in FIG. 1, inertial sensor compensation and correction module 18 receives Kalman scale factor and bias error correction values from Kalman estimator module 22 and also applies the Kalman scale factor and bias error correction values to sensor inputs $V_A$, $V_T$ and $V_\omega$ to correct for non-deterministic sensor errors, as is further described below.

Inertial sensor compensation and correction module 18 outputs the error-compensated and error-corrected sensor inputs $V_A$, $V_T$ and $V_\omega$ (i.e., compensated and corrected via application of the temperature-dependent scale factor error compensation values, the Kalman scale factor error correction values, the temperature-dependent bias error compensation values, the Kalman bias error correction values, the non-linearity error compensation values, and the non-orthogonality error compensation values) as body-axis angular rates 12 and body-axis accelerations 14. As such, body-axis angular rates 12 and body-axis accelerations 14 represent error-compensated and error-corrected output values of rate gyroscopes 32A-32C and accelerometers 24A-24C, respectively, after compensation for deterministic errors (e.g., temperature-dependent scale factor errors, temperature-dependent bias errors, sensor non-linearity errors, and non-orthogonality errors) and correction for non-deterministic scale factor and bias errors that may arise during operation of IMU 10 (e.g., turn-on to turn-on bias and scale factor errors, vibration-related bias and scale factor errors, or other non-deterministic errors).

As illustrated in FIG. 1, Kalman estimator module 22 receives as inputs body-axis angular rates 12 and body-axis accelerations 14 from inertial sensor compensation and correction module 18, as well as true airspeed 36 and angle of attack 38 from, e.g., an aircraft air data system. In addition, Kalman estimator module 22 receives attitude information corresponding to aircraft roll and pitch in the form of attitude quaternion $q^C$ from attitude determination module 20.

As is further described below, attitude determination module 20 utilizes body-axis angular rates 12 and body-axis accelerations 14 to determine an attitude quaternion $q^C$ corresponding to a coordinate transform between local level and body-axis roll and pitch of, e.g., an aircraft within which IMU 10 is installed. The determined attitude quaternion $q^C$ is provided to Kalman estimator module 22.

Kalman estimator module 22 utilizes attitude quaternion $q^C$ determined by attitude determination module 20 as well as body-axis angular rates 12 and body-axis accelerations 14 to determine a change in an integrated body-axis acceleration over a relative short time duration (e.g., 0.5 seconds, 1.0 second, or other time durations), as is further described below. Kalman estimator module 22 compares the determined change in the integrated body-axis acceleration over the time duration to a difference in the received true airspeed 36 over the same time duration to determine an airspeed difference value. Kalman estimator module 22 provides the airspeed difference value as input to an extended Kalman filter implemented by Kalman estimator module 22 to determine estimated scale factor errors and bias errors for each of accelerometers 24A-24C and rate gyroscopes 32A-32C. The estimated scale factor errors and bias errors for each of accelerometers 24A-24C and rate gyroscopes 32A-32C are provided to inertial sensor compensation and correction module 18 as Kalman scale factor error correction values and Kalman bias error correction values associated with each of accelerometers 24A-24C and rate gyroscopes 32A-32C.

Inertial sensor compensation module 18 applies the received Kalman scale factor error correction values and bias error correction values, the temperature-dependent scale factor and bias error compensation values, the non-linearity error compensation values, and the non-orthogonality error compensation values to each of the received inputs from accelerometers 24A-24C and rate gyroscopes 32A-32C to produce error-corrected output values body-axis angular rates 12 and body-axis accelerations 14. Accordingly, IMU 10, implementing techniques of this disclosure, iteratively determines Kalman scale factor and bias error correction values that are applied to (e.g., subtracted from, added to, or otherwise applied to) sensed values from accelerometers 24A-24C and rate gyroscopes 32A-32C to correct for non-deterministic scale factor errors and bias errors that are unpredictable in nature. The compensation for deterministic errors (e.g., via the temperature-dependent scale factor and bias error compensation values, the non-linearity error compensation values, and the non-orthogonality error compensation values) as well as the non-deterministic errors (e.g., via the Kalman scale factor and bias error correction values) increases the accuracy of body-axis angular rates 12 and body-axis accelerations 14 representing outputs of IMU 10 to consuming systems. As such, the techniques described herein can enable more accurate and precise operation of consuming systems, such as inertial navigation or other consuming systems.

Figure 2:
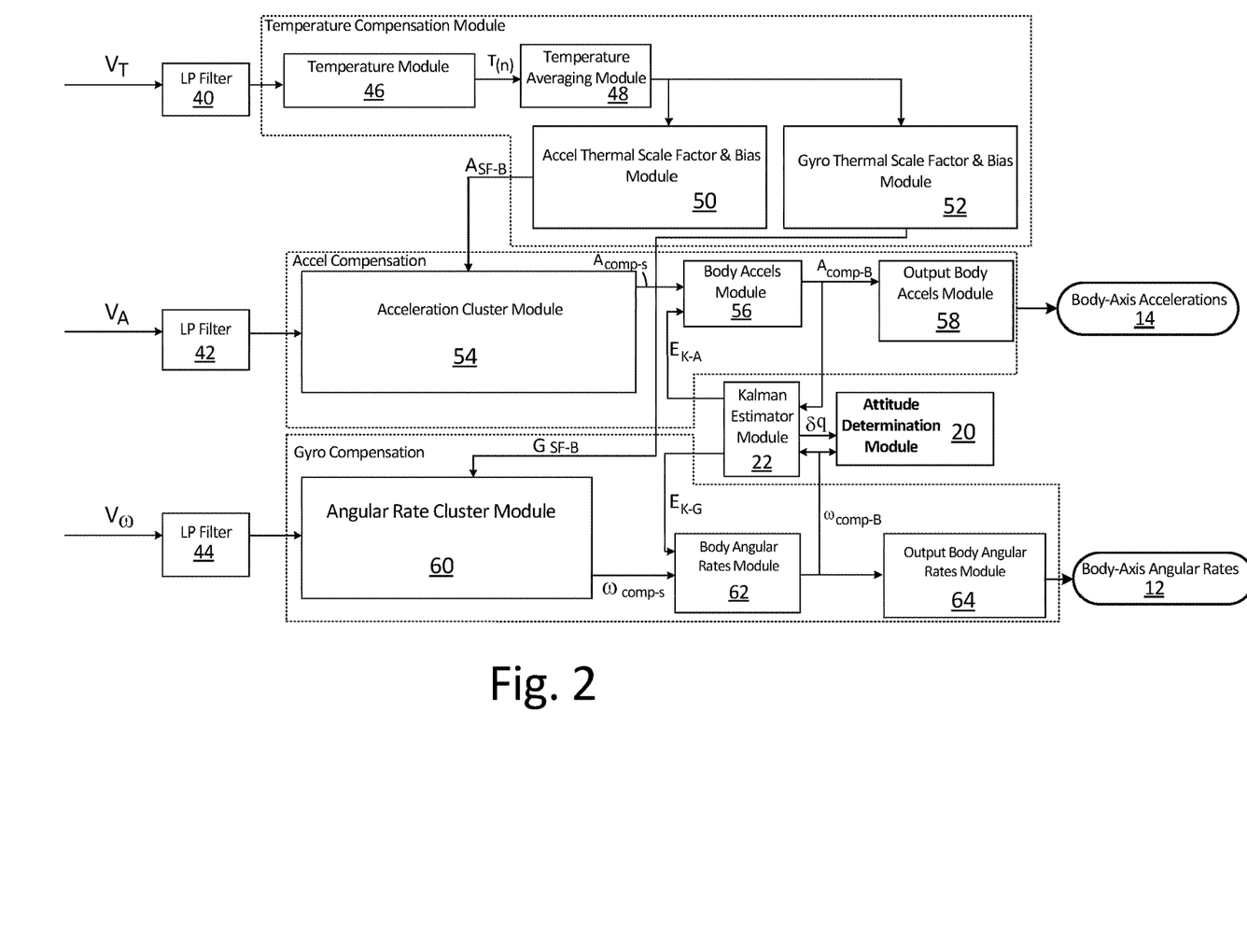
FIG. 2 is a schematic block diagram illustrating further details of the inertial sensor compensation and correction module of FIG. 1 to produce error-corrected acceleration and angular rate outputs.

FIG. 2 is a schematic block diagram illustrating further details of inertial sensor compensation and correction module 18 of FIG. 1 to produce error-compensated body-axis angular rates 12 and body-axis accelerations 14. As illustrated in FIG. 2, inertial sensor compensation and correction module 18 includes temperature low-pass filter 40, accelerometer low-pass filter 42, rate gyroscope low-pass filter 44, temperature module 46, temperature averaging module 48, accelerometer thermal scale factor and bias module 50, rate gyroscope thermal scale factor and bias module 52, acceleration cluster module 54, body accelerations module 56, output body accelerations module 58, angular rate cluster module 60, body angular rates module 62, and output body angular rates module 64. As further illustrated, inertial sensor compensation and correction module 18 receives $V_T$, $V_A$, and $V_\omega$ as inputs from inertial sensor assembly 16 (FIG. 1). In addition, inertial sensor compensation and correction module 18 receives Kalman accelerometer scale factor and bias error correction values $E_{K-A}$ and Kalman rate gyroscope scale factor and bias error correction values $E_{K-G}$ from Kalman estimator module 22. Inertial sensor compensation and correction module 18 outputs body-axis accelerations 14 and body-axis angular rates 12 via, e.g., one or more communication data buses for use by a consuming system, such as an aircraft inertial navigation system, stability augmentation system, or other consuming system. In addition, inertial sensor compensation and correction module 18 provides compensated and corrected body-axis accelerations $A_{comp-B}$ as input to Kalman estimator module 22 as well as compensated and corrected body-axis angular rates $\omega_{comp-B}$ as input to both Kalman estimator module 22 and attitude determination module 20. Kalman estimator module 22 provides tilt error correction values δq as input to attitude determination module 20.

Each of temperature low-pass filter 40, accelerometer low-pass filter 42, and rate gyroscope low-pass filter 44 are low-pass filters (e.g., Butterworth low-pass filters or other types of low-pass filters) implemented in hardware and/or software and configured to pass signals with frequencies lower than a cutoff frequency and attenuate signals with frequencies higher than the cutoff frequency. Each of temperature low-pass filter 40, accelerometer low-pass filter 42, and rate gyroscope low-pass filter 44 can be configured with a same or different cutoff frequency.

The output of temperature low-pass filter 40 is provided to temperature module 46, which in turn provides temperatures T(n) as outputs to each of accelerometer thermal scale factor and bias module 50 and rate gyroscope thermal scale factor and bias module 52. Accelerometer thermal scale factor and bias module 50 outputs temperature-dependent accelerometer scale factor and bias error compensation values $A_{SF-B}$ to acceleration cluster module 54. Rate gyroscope thermal scale factor and bias module 52 outputs temperature-dependent rate gyroscope scale factor and bias error compensation values $G_{SF-B}$ to angular rate cluster module 60. The combined operations of temperature module 46, temperature averaging module 48, accelerometer thermal scale factor and bias module 50, and rate gyroscope thermal scale factor and bias module 52 form temperature compensation operations that provide temperature compensation scale factor and bias error compensation values for application to (e.g., subtraction from) input values sensed by accelerometers 24A-24C and rate gyroscopes 32A-32C (FIG. 1).

Acceleration cluster module 54 receives the temperature compensation scale factor and bias error compensation values $A_{SF-B}$ from accelerometer thermal scale factor and bias module 50 and applies the temperature-dependent accelerometer scale factor error compensation values and the temperature-dependent accelerometer bias error compensation values, as well as the accelerometer non-linearity error compensation values and the accelerometer non-orthogonality error compensation values (e.g., stored in computer-readable memory of IMU 10) to produce compensated accelerometer values $A_{comp-S}$ in the sensor axis that are provided to body accelerations module 56. Body accelerations module 56 receives the compensated sensor-axis accelerations $A_{comp-S}$ from acceleration cluster module 54 and Kalman accelerometer scale factor and bias error correction values $E_{K-A}$ from Kalman estimator module 22. Body accelerations module 56 converts the compensated sensor-axis accelerations $A_{comp-S}$ to the aircraft (or other vehicle) body-axis and applies the Kalman accelerometer scale factor and bias error correction values $E_{K-A}$ to produce compensated and corrected accelerometer values $A_{comp-B}$ in the body-axis that are provided as input to both output body accelerations module 58 and Kalman estimator module 22. Output body accelerations module 58 bandwidth-limits the received compensated and corrected body-axis accelerations $A_{comp-B}$ to produce body-axis accelerations 14. The combined operations of acceleration cluster module 54, body accelerations module 56 and output body accelerations module 58 form accelerometer compensation operations that apply both deterministic error compensation values (e.g., temperature-dependent accelerometer scale factor error compensation values, temperature-dependent accelerometer bias error compensation values, accelerometer non-linearity error compensation values, and accelerometer non-orthogonality error compensation values) and non-deterministic correction values (e.g., Kalman accelerometer scale factor error correction values and Kalman accelerometer bias error correction values) to produce body-axis accelerations 14 (i.e., accelerations along each of the three axes of accelerometers 24A-24C) that are error-compensation and error-corrected for both the deterministic and non-deterministic errors.

As further illustrated in FIG. 2, angular rate cluster module 60 receives the temperature compensation scale factor and bias error compensation values $G_{SF-B}$ from rate gyroscope thermal scale factor and bias module 52 and applies the temperature-dependent rate gyroscope scale factor error compensation values and the temperature-dependent rate-gyroscope bias error compensation values, as well as the rate gyroscope non-linearity error compensation values and the rate gyroscope non-orthogonality error compensation values (e.g., stored in computer-readable memory of IMU 10) to produce compensated angular rate values $\omega_{comp-S}$ in the sensor axis that are provided to body angular rates module 62. Body angular rates module 62 receives the compensated sensor-axis angular rate values $\omega_{comp-S}$ from angular rate cluster module 60 and Kalman rate gyroscope scale factor and bias error correction values $E_{K-G}$ from Kalman estimator module 22. Body angular rates module 62 converts the compensated sensor-axis angular rates $\omega_{comp-S}$ to the aircraft (or other vehicle) body-axis and applies the Kalman rate gyroscope scale factor and bias error correction values $E_{K\text{-}G}$ to produce compensated and corrected angular rate values $\omega_{comp\text{-}B}$ in the body-axis that are provided as input to output body angular rates module 64, Kalman estimator module 22, and attitude determination module 20. Output body angular rates module 64 bandwidth-limits the received compensated and corrected body-axis angular rates $\omega_{comp\text{-}B}$ to produce body-axis angular rates 12. The combined operations of angular rate cluster module 60, body angular rates module 62 and output body angular rates module 64 form rate gyroscope compensation operations that apply deterministic error compensation values (e.g., temperature-dependent rate gyroscope scale factor error compensation values, temperature-dependent rate gyroscope bias error compensation values, rate gyroscope non-linearity error compensation values, and rate gyroscope non-orthogonality error compensation values) and non-deterministic error-correction values (e.g., Kalman rate gyroscope scale factor error correction values and Kalman rate gyroscope bias error correction values) to produce body-axis angular rates 12 (i.e., angular rates in each of the three axes of rate gyroscopes 32A-32C) that are error-compensation and error-corrected to compensate and correct for both the deterministic and non-deterministic errors.

In operation, temperature module 46 receives low-pass filtered inputs $V_T$ from low-pass filter 40 which represents a three-dimensional vector, each element corresponding to a filtered digital representation of a voltage output of one of temperature sensors 28A, 28B, and 28C. Temperature module 46 converts the voltage representation associated with each of temperature sensors 28A-28C to a separate temperature value using a polynomial curve-fit having coefficients selected during, e.g., a testing phase to fit an output of the respective temperature sensors 28A-28C to a reference temperature input. Temperature module 46 provides temperatures T(n) (i.e., three temperature values, each corresponding to one of temperature sensors 28A-28C) to temperature averaging module 48. Temperature averaging module produces an average temperature output for each of the received input temperatures T(n), such as by using a moving average (e.g., over 8 samples, 10 samples, or other number of samples) or other central tendency technique. Temperature averaging module 48 provides the average temperature associated with each of temperature sensors 28A-28C to each of accelerometer thermal scale factor and bias module 50 and rate gyroscope thermal scale factor and bias module 52.

Accelerometer thermal scale factor and bias module 50 determines a temperature-dependent accelerometer scale factor error compensation value and a temperature-dependent accelerometer bias error compensation value corresponding to each of accelerometers 24A-24C. For example, accelerometer thermal scale factor and bias module 50 can apply the average input temperature value for the one of temperature sensors 28A-28C that is associated with (e.g. mounted proximate) accelerometer 24A as input to a polynomial curve fit of temperature-dependent accelerometer scale factor errors corresponding to accelerometer 24A having coefficients determined during, e.g., a testing phase (e.g., in a laboratory or manufacturing phase). Accelerometer thermal scale factor and bias module 50 can similarly apply average input temperature values for each of temperature sensors 28B and 28C that are associated with accelerometers 24B and 24C as input to separate polynomial curve fits of temperature-dependent accelerometer scale factor errors corresponding to each of accelerometer 24B and 24C having coefficients determined during the testing and/or manufacturing phase. Accelerometer thermal scale factor and bias module 50 applies the average temperature input value for each of temperature sensors 28A-28C as input to polynomial curve fits of temperature-dependent bias errors of accelerometers 24A-24C (each of the polynomial curve fits having coefficients determined during the testing and/or manufacturing phase) to determine temperature-dependent bias error compensation values corresponding to each of accelerometers 24A-24C.

Rate gyroscope thermal scale factor and bias module 52 determines a temperature-dependent rate gyroscope scale factor error compensation value and a temperature-dependent rate gyroscope bias error compensation value corresponding to each of rate gyroscopes 32A-32C. For example, rate gyroscope thermal scale factor and bias module 52 can apply the average input temperature value for the one of temperature sensors 28A-28C that is associated with (e.g. mounted proximate) rate gyroscope 32A as input to a polynomial curve fit of temperature-dependent rate gyroscope scale factor errors corresponding to rate gyroscope 32A having coefficients determined during, e.g., a testing phase (e.g., in a laboratory or manufacturing phase). Rate gyroscope thermal scale factor and bias module 52 can similarly apply average input temperature values for each of temperature sensors 28B and 28C that are associated with rate gyroscopes 32B and 32C as input to separate polynomial curve fits of temperature-dependent rate gyroscope scale factor errors corresponding to each of rate gyroscopes 32B and 32C having coefficients determined during the testing and/or manufacturing phase. Rate gyroscope thermal scale factor and bias module 52 applies the average temperature input value for each of temperature sensors 28A-28C as input to polynomial curve fits of temperature-dependent bias errors corresponding to each of rate gyroscopes 32A-32C (each of the polynomial curve fits having coefficients determined during the testing and/or manufacturing phase) to determine temperature-dependent bias error compensation values corresponding to each of rate gyroscopes 32A-32C.

Acceleration cluster module 54 receives the temperature-dependent accelerometer scale factor error compensation values and the temperature-dependent accelerometer bias error compensation values from accelerometer thermal scale factor and bias module 50. In addition, acceleration cluster module 54 receives low-pass filtered inputs $V_A$ from low-pass filter 42 which represents a three-dimensional vector, each element corresponding to a filtered digital representation of a voltage output of one of accelerometers 24A, 24B, and 24C. Acceleration cluster module 54 converts the voltage representation of each filtered input $V_A$ to an acceleration value (e.g., in meters/second/second). In addition, acceleration cluster module 54 applies the received temperature-dependent accelerometer scale factor error compensation values corresponding to each of accelerometers 24A-24C to the inputs $V_A$, such as by multiplying each of inputs $V_A$ by the corresponding temperature-dependent accelerometer scale factor error compensation value. Acceleration cluster module 54 applies the received temperature-dependent accelerometer bias error compensation values corresponding to each of accelerometers 24A-24C to the inputs $V_A$ via aggregation techniques (e.g., summing, subtracting, or other aggregation techniques). In addition, acceleration cluster module 54 applies (e.g., multiplies) the non-linearity error compensation values and the non-orthogonality error compensation values corresponding to each of accelerometers 24A-24C (e.g., determined during a testing and/or manufacturing phase and stored in computer-readable memory of IMU 10) to the respective inputs $V_A$ to produce compensated sensor-axis accelerations $A_{comp-S}$. Sensor-axis accelerations $A_{comp-S}$ therefore represent acceleration values associated with each of accelerometers 24A-24C in the sensor axis that have been compensated for deterministic errors corresponding to temperature-dependent scale factor and bias errors, sensor non-linearity errors, and non-orthogonality errors associated with a misalignment (i.e., non-mutually-orthogonal) of installation of accelerometers 24A-24C.

Body accelerations module 56 receives the compensated sensor-axis accelerations $A_{comp-S}$ and converts the accelerations from the sensor coordinate frame to an aircraft (or other vehicle to which IMU 10 is mounted) coordinate frame using a rotational matrix such as a direction cosine matrix having direction angles configured to transform the sensor coordinate frame to the aircraft body axis frame. In addition, body accelerations module 56 receives Kalman accelerometer scale factor and bias error correction values $E_{K-A}$ from Kalman estimator module 22. As is further described below, Kalman accelerometer scale factor and bias error correction values $E_{K-A}$ include scale factor error correction values and bias error correction values produced by an extended Kalman filter implemented by Kalman estimator module 22, each of the scale factor error correction values and bias error correction values corresponding to one of accelerometers 24A-24C. Body accelerations module 56 applies the Kalman accelerometer scale factor and bias error correction values $E_{K-A}$ to the compensated acceleration values $A_{comp-S}$ to produce compensated and corrected acceleration values $A_{comp-B}$ in the body axis corresponding to each of accelerometers 24A-24C. The body axis can be defined by three mutually-orthogonal axes, a first of the three axes directed through the nose of the aircraft, a second of the three axes directed through a bottom of the aircraft toward the Earth when the aircraft is on-ground, and a third of the three axes directed orthogonally to the first axis and to the second axis and generally through a wing of the aircraft. Compensated and corrected acceleration values $A_{comp-B}$ therefore represent body axis (e.g., aircraft body axis) accelerations corresponding to each of accelerometers 24A-24C that are compensated for deterministic errors (e.g., temperature-dependent scale factor and bias errors, sensor non-linearity errors, and non-orthogonality errors) and corrected for non-deterministic errors via Kalman scale factor and bias error correction values $E_{K-A}$.

Body accelerations module 56 provides compensated and corrected acceleration values $A_{comp-B}$ to output body accelerations module 58 and Kalman estimator module 22. Output body accelerations module 58 bandwidth-limits the output of compensated and corrected acceleration values $A_{comp-B}$ via, e.g., an infinite impulse response (IIR) or other bandwidth-limiting filter to a defined bandwidth of a consuming system, such as an aircraft inertial navigation system. The bandwidth-limited acceleration values are provided by output body accelerations module 58 as body-axis accelerations 14.

As further illustrated in FIG. 2, temperature-dependent rate gyroscope scale factor and error compensation values and temperature-dependent rate gyroscope bias error compensation values determined by rate gyroscope thermal scale factor and bias module 52 are provided to angular rate cluster module 60 as input. In addition, angular rate cluster module 60 receives low-pass filtered inputs $V_\omega$ from low-pass filter 44 which represents a three-dimensional vector, each element corresponding to a filtered digital representation of a voltage output of one of rate gyroscopes 32A, 32B, and 32C. Angular rate cluster module 60 converts the voltage representation of each filtered input $V_\omega$ to an angular rate value (e.g., in meters/second). In addition, angular rate cluster module 60 applies the received temperature-dependent rate gyroscope scale factor error compensation values corresponding to each of rate gyroscopes 32A-32C to the inputs $V_\omega$, such as by multiplying each of inputs $V_\omega$ by the corresponding temperature-dependent rate gyroscope scale factor error compensation value. Angular rate cluster module 60 applies the received temperature-dependent rate gyroscope bias error compensation values corresponding to each of rate gyroscopes 32A-32C to the inputs $V_\omega$ via aggregation techniques (e.g., summing, subtracting, or other aggregation techniques). In addition, angular rate cluster module 50 applies (e.g., multiplies) the non-linearity error compensation values and the non-orthogonality error compensation values corresponding to each of rate gyroscopes 32A-32C (e.g., determined during a testing and/or manufacturing phase and stored in computer-readable memory of IMU 10) to the respective inputs $V_\omega$ to produce compensated sensor-axis angular rates $\omega_{comp-S}$. Sensor-axis angular rates $\omega_{comp-S}$ therefore represent angular rate values associated with each of rate gyroscopes 32A-32C in the sensor axis that have been compensated for deterministic errors corresponding to temperature-dependent scale factor and bias errors, sensor non-linearity errors, and non-orthogonality errors associated with a misalignment (i.e., non-mutually-orthogonal) of installation of rate gyroscopes 32A-32C.

Body angular rates module 62 receives the compensated sensor-axis angular rate values $\omega_{comp-S}$ and converts the accelerations from the sensor coordinate frame to an aircraft (or other vehicle to which IMU 10 is mounted) coordinate frame using a rotational matrix such as a direction cosine matrix having direction angles configured to transform the sensor coordinate frame to the aircraft body axis frame. In addition, body angular rates module 60 receives Kalman rate gyroscope scale factor and bias error correction values $E_{K-G}$ from Kalman estimator module 22. As is further described below, Kalman rate gyroscope scale factor and bias error correction values $E_{K-G}$ include scale factor error correction values and bias error correction values produced by the extended Kalman filter implemented by Kalman estimator module 22, each of the scale factor error correction values and bias error correction values corresponding to one of rate gyroscopes 32A-32C. Body angular rates module 62 applies the Kalman rate gyroscope scale factor and bias error correction values $E_{K-G}$ to the compensated angular rate values $\omega_{comp-S}$ to produce compensated and corrected angular rate values $\omega_{comp-B}$ in the body axis corresponding to each of rate gyroscopes 32A-32C. As described above, the body axis can be defined by three mutually-orthogonal axes, a first of the three axes directed through the nose of the aircraft, a second of the three axes directed through a bottom of the aircraft toward the Earth when the aircraft is on-ground, and a third of the three axes directed orthogonally to the first axis and to the second axis and generally through a wing of the aircraft. Compensated and corrected angular rate values $\omega_{comp-B}$ therefore represent body axis (e.g., aircraft body axis) angular rates corresponding to each of rate gyroscopes 32A-32C that are compensated for deterministic errors (e.g., temperature-dependent scale factor and bias errors, sensor non-linearity errors, and non-orthogonality errors) as well as corrected for non-deterministic errors via Kalman scale factor and bias error correction values $E_{K-G}$.

Body angular rates module 62 provides compensated and corrected angular rate values $\omega_{comp-B}$ to each of output body angular rates module 64, attitude determination module 20, and Kalman estimator module 22. Output body angular rates module 64 bandwidth-limits the output of compensated and corrected angular rate values $\omega_{comp-B}$ via, e.g., an infinite impulse response (IIR) or other bandwidth-limiting filter to a defined bandwidth of a consuming system, such as an aircraft inertial navigation system. The bandwidth-limited angular rate values are provided by output body angular rates module 64 as body-axis angular rates 12.

Accordingly, IMU 10 implementing techniques described herein outputs body-axis angular rates 12 and body-axis accelerations 14 that are compensated to correct for deterministic errors and corrected for non-deterministic errors. The techniques of this disclosure therefore increase an accuracy of outputs of IMU 10 and enable IMU 10 to adaptively modify such outputs (i.e., body-axis angular rates 12 and body-axis accelerations 14) to account for unpredictable errors that can arise during operation of IMU 10 manifesting as sensor bias and scale factor errors.

Figure 3:
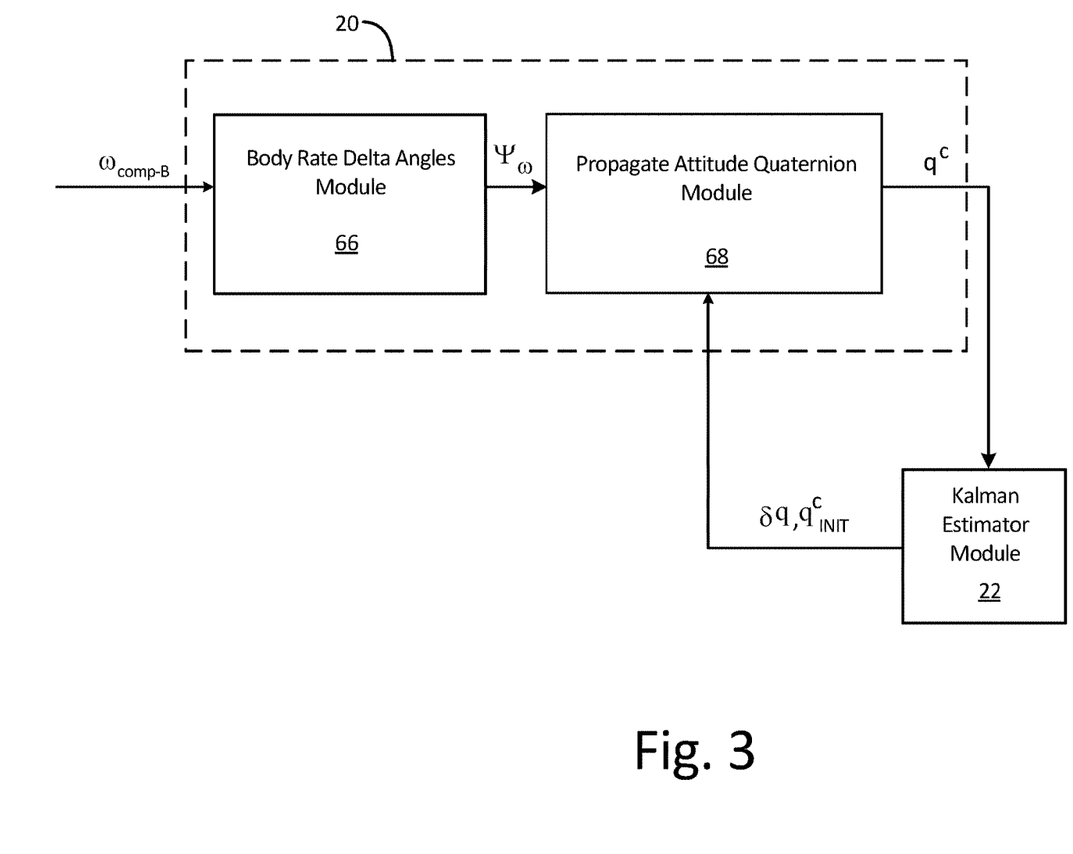
FIG. 3 is a schematic block diagram illustrating further details of the attitude determination module of FIG. 1 to determine a vehicle attitude using the error-corrected and compensated acceleration and angular rate outputs from the inertial sensor compensation and correction module.

FIG. 3 is a schematic block diagram illustrating further details of attitude determination module 20 of FIG. 1. As illustrated in FIG. 3, attitude determination module 20 includes body rate delta angles module 66 and propagate attitude quaternion module 68. Attitude determination module 20 receives compensated and corrected angular rate values $\omega_{comp-B}$ as inputs from inertial sensor compensation and correction module 18. Attitude determination module 20 outputs attitude quaternion $q^C$ to Kalman estimator module 22.

As illustrated in FIG. 3, body rate delta angles module 66 receives compensated and corrected angular rate values $\omega_{comp-B}$ (i.e., compensated and corrected angular rates corresponding to the outputs from each of rate gyroscopes 32A-32C of FIG. 1) from inertial sensor compensation and correction module 18 (FIGS. 1 and 2) and provides angular displacement changes $\psi_\omega$ corresponding to each of rate gyroscopes 32A-32C as input to propagate attitude quaternion module 68. Propagate attitude quaternion module 68 receives angular displacement changes $\psi_\omega$ as input from body rate delta angles module 66 as well as initial attitude quaternion $q^C_{init}$ and tilt error correction values $\delta q$ from Kalman estimator module 22. Propagate attitude quaternion module 68 provides attitude quaternion $q^C$ as input to Kalman estimator module 22.

In operation, body rate delta angles module 66 receives compensated and corrected angular rate values $\omega_{comp-B}$ corresponding to the compensated and corrected outputs of each of rate gyroscopes 32A-32C. Body rate delta angles module 66 integrates each of the compensated and corrected angular rate values $\omega_{comp-B}$ over a relatively short time interval, such as 0.001 seconds (i.e., corresponding to a 1 kHz sampling rate) to produce angular displacement changes $\psi_\omega$ corresponding to a change in angular displacement sensed by each of rate gyroscopes 32A-32C over the time interval.

Propagate attitude quaternion module 68 receives angular displacement changes $\psi_\omega$ from body rate delta angles module 66 and propagates the angular displacement changes over the time interval (e.g., 0.001 seconds) in quaternion form to produce attitude quaternion $q^C$. Propagate attitude quaternion module 68 receives initial attitude quaternion $q^C_{init}$ from Kalman estimator module 22 representing an initial attitude of IMU 10, as is further described below. Propagate attitude quaternion module 68 propagates the received angular displacement changes $\psi_\omega$ over the time interval relative to the initial attitude quaternion $q^C_{init}$ received from Kalman estimator module 22 (e.g., during a first execution of the attitude propagation operations). Propagate attitude quaternion module 68 applies tilt error correction values $\delta q$ to the propagated attitude quaternion (e.g., via quaternion multiplication) to produce the error-corrected attitude quaternion $q^C$.

As such, IMU 10 implementing techniques of this disclosure determines vehicle attitude information represented by attitude quaternion $q^C$ that is utilized by Kalman estimator module 22 to estimate sensor scale factor and bias errors that are provided as feedback to adjust and correct the sensed output values of accelerometers 24A-24C and gyroscopes 32A-32C.

Figure 4:
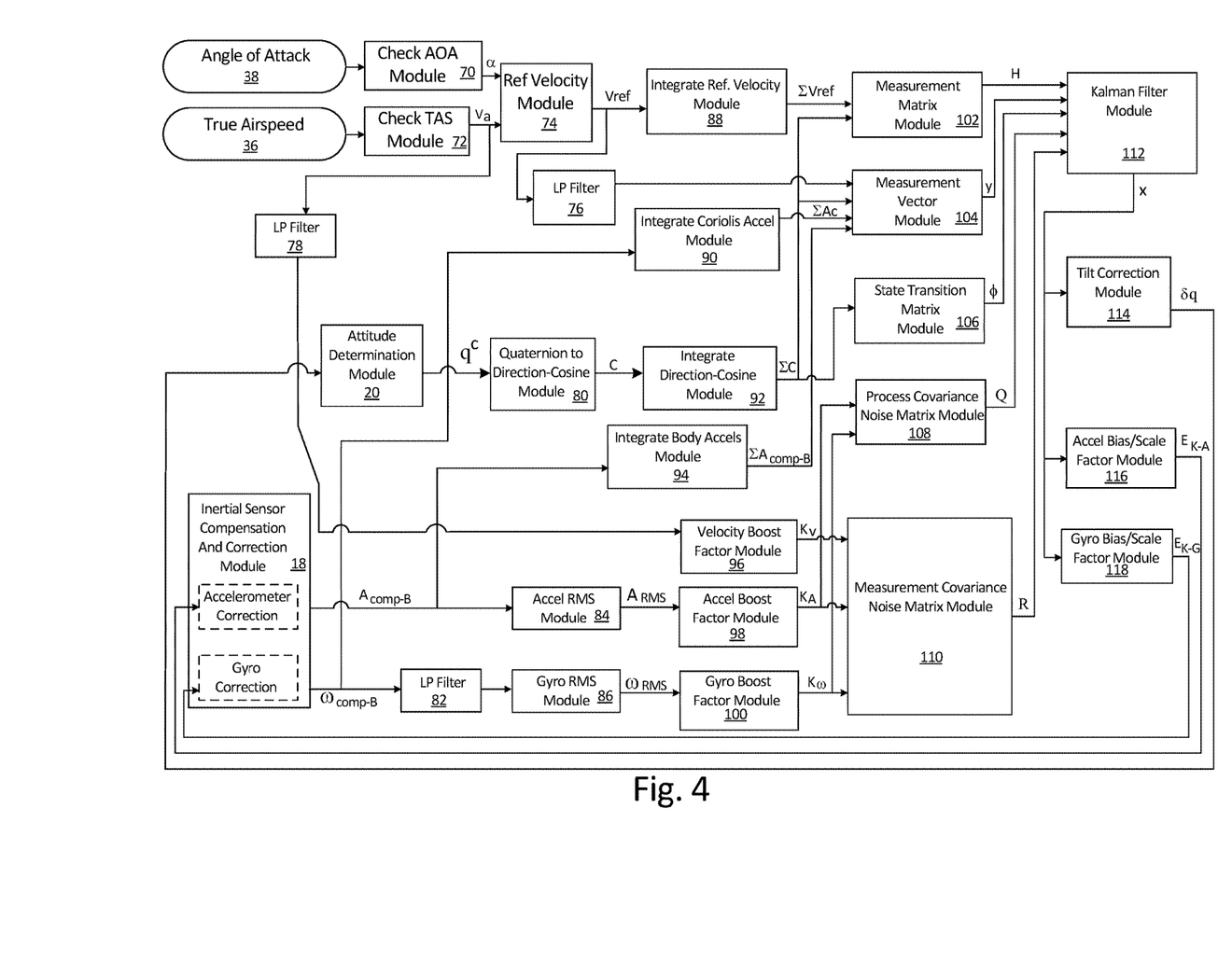
FIG. 4 is a schematic block diagram illustrating further details of the Kalman estimator module of FIG. 1 to produce bias and scale factor error correction values that are utilized by the IMU to produce error-corrected acceleration and angular rate outputs.

FIG. 4 is a schematic block diagram illustrating further details of Kalman estimator module 22 to produce Kalman accelerometer scale factor and bias error correction values $E_{K-A}$, Kalman rate gyroscope scale factor and bias error correction values $E_{K-G}$, and tilt error correction values $\delta q$. As illustrated in FIG. 4, Kalman estimator module 22 includes check angle of attack (AOA) module 70, check true airspeed (TAS) module 72, reference velocity module 74, low-pass filter 76, low-pass filter 78, quaternion to direction-cosine module 80, low-pass filter 82, accelerometer root mean square (RMS) module 84, rate gyroscope RMS module 86, integrate reference velocity module 88, integrate Coriolis acceleration module 90, integrate direction-cosine module 92, integrate body accelerations module 94, velocity boost factor module 96, accelerometer boost factor module 98, rate gyroscope boost factor module 100, measurement matrix module 102, measurement vector module 104, state transition matrix module 106, process covariance noise matrix module 108, measurement covariance noise matrix module 110, Kalman filter module 112, tilt correction module 114, accelerometer bias and scale factor module 116, and rate gyroscope bias and scale factor module 118. As further illustrated, Kalman estimator module 22 receives true airspeed 36 and angle of attack 38 as input from, e.g., an aircraft air data system, attitude quaternion $q^C$ as input from attitude determination module 20, and compensated and corrected body-axis accelerations $A_{comp-B}$ and compensated and corrected body-axis angular rates $\omega_{comp-B}$ as input from inertial sensor compensation and correction module 18. Kalman estimator module 22 outputs tilt error correction values $\delta q$, which are received as input by attitude determination module 20. In addition, Kalman estimator module 22 outputs accelerometer scale factor and bias error correction values $E_{K-A}$, as well as rate gyroscope scale factor and bias error correction values $E_{K-G}$. Accelerometer scale factor and bias error correction values $E_{K-A}$ and rate gyroscope scale factor and bias error correction values $E_{K-G}$ are received as input by inertial sensor compensation and correction module 18.

Check AOA module 70 receives angle of attack 38 as input, and outputs angle of attack α to reference velocity module 74. Check TAS module 72 receives true airspeed 36 as input and provides airspeed Va as output to reference velocity module 74 and low-pass filter 78, which passes the filtered reference velocity as input to velocity boost factor module 96. Compensated and corrected body-axis accelerations $A_{comp-B}$ are received as input by both accelerometer RMS module 84 and integrate body accelerations module 94. Compensated and corrected body-axis angular rates $\omega_{comp-B}$ are received as input by both low-pass filter 82 and integrate Coriolis accelerations module 90. Attitude quaternion $q^C$ is received as input by quaternion to direction-cosine module 80.

Reference velocity module 74 outputs body-axis reference velocity vector $V_{ref}$, which is received as input by each of integrate reference velocity module 88, low-pass filter 76, and integrate Coriolis acceleration module 90. Low-pass filter 76 provides a filtered output of body-axis reference velocity vector $V_{ref}$ to measurement vector module 104. Integrate reference velocity module 88 outputs integrated body-axis reference velocity vector $\Sigma V_{ref}$ to measurement matrix module 102. Integrate Coriolis accelerations module 90 outputs integrated Coriolis acceleration $\Sigma A_C$ to measurement vector module 104. Quaternion to direction-cosine module outputs direction-cosine matrix C to integrate direction-cosine module 92, which provides integrated direction-cosine matrix $\Sigma C$ as output to each of measurement matrix module 102, measurement vector module 104, and state transition matrix module 106. Integrate body accelerations module 94 outputs integrated compensated and corrected body-axis accelerations $\Sigma A_{comp-B}$ to measurement vector module 104. Accelerometer RMS module 84 receives compensated and corrected body-axis accelerations $A_{comp-B}$ from inertial sensor compensation and correction module 18, and outputs accelerations root mean square $A_{RMS}$ to accelerometer boost factor module 98. Rate gyroscope RMS module 86 receives filtered compensated and corrected body-axis angular rates $\omega_{comp-B}$ from low-pass filter 82 and outputs angular rates root mean square $\omega_{RMS}$ to rate gyroscope boost factor module 100. Velocity boost factor module outputs velocity boost factor $K_V$ to measurement covariance noise matrix module 110. Accelerometer boost factor module 98 outputs acceleration boost factor $K_A$, which is received as input by each of process covariance noise matrix module 108 and measurement covariance noise matrix module 110. Rate gyroscope boost factor module 100 outputs angular rate boost factor $K_\omega$ to each of process covariance noise matrix module 108 and measurement covariance noise matrix module 110.

Measurement matrix module 102 outputs measurement matrix H to Kalman filter module 112. Measurement vector module 104 provides measurement vector y as input to Kalman filter module 112. State transition matrix module 106 outputs state transition matrix φ, which is received as input by Kalman filter module 112. Process covariance noise matrix module 108 outputs process covariance noise matrix Q, and measurement covariance noise matrix module 110 outputs measurement covariance noise matrix R. Each of process covariance noise matrix Q and measurement covariance noise matrix R is received as input by Kalman filter module 112.

Kalman filter module 112 outputs Kalman state vector X, which is received as input by each of tilt correction module 114, accelerometer bias and scale factor module 116, and rate gyroscope bias and scale factor module 118. Tilt correction module 114 outputs tilt error correction values δq to attitude determination module 20. Accelerometer bias and scale factor module 116 provides Kalman accelerometer scale factor and bias error correction values $E_{K-A}$ as input to inertial sensor compensation and correction module 118. Rate gyroscope bias and scale factor module 118 outputs Kalman rate gyroscope scale factor and bias error correction values $E_{K-G}$, which is received as input by inertial sensor compensation and correction module 18.

In operation, check AOA module 70 receives angle of attack 38 from, e.g., an aircraft air data system or other source. Check AOA module 70 determines whether the received angle of attack 38 is valid, such as by determining whether angle of attack 38 is within a predefined range of valid angles of attack and/or by accessing validity information included with angle of attack 38 (e.g., status field(s), bit(s), or other information indicating a validity status of angle of attack 38). Check AOA module 70 outputs angle of attack α as equal to the value (e.g., scalar value) of angle of attack 38 in response to determining that angle of attack 38 is valid. Check AOA module 70 outputs α as equal to a value of zero in response to determining that angle of attack 38 is invalid. Similarly, check TAS module 72 receives true airspeed 36 and determines a validity status of true airspeed 36 by determining whether true airspeed 36 is within a predefined range of valid true airspeeds and/or by accessing validity information included with true airspeed 36. Check TAS module 72 outputs airspeed Va as equal to the value (e.g., scalar value) of true airspeed 36 in response to determining that true airspeed 36 is valid. Check TAS module 72 outputs airspeed Va as equal to a value of zero in response to determining that true airspeed 36 is invalid.

Each of low-pass filters 76, 78, and 82 can be Butterworth filters, infinite impulse response filters, or other types of low-pass filters implemented in hardware and/or software and configured to pass signals with frequencies lower than a cutoff frequency and attenuate signals with frequencies higher than the cutoff frequency. Each of low-pass filters 76, 78, and 82 can be configured with a same or different cutoff frequency, and can be implemented using the same or different types of low-pass filters. Low-pass filter 78 receives airspeed Va and provides a filtered output of airspeed Va to velocity boost factor module 96.

Reference velocity module 74 utilizes angle of attack α and airspeed Va to produce body-axis reference velocity vector $V_{ref}$. That is, reference velocity module 74 uses angle of attack α to convert the received scalar airspeed Va into a vector representation of the body frame velocity by attributing the airspeed Va to the forward and vertical body-axis velocity components using angle of attack α. Low-pass filter 76 receives body-axis reference velocity vector $V_{ref}$ and provides a low-pass filtered output of body-axis reference velocity vector $V_{ref}$ as input to measurement vector module 104. Quaternion to direction-cosine module 80 applies a transformation matrix to attitude quaternion $q^C$ representing attitude information of IMU 10 (e.g., pitch, roll, and yaw) to produce direction cosine matrix C representing the attitude information in direction-cosine form.

Each of integrate reference velocity module 88, integrate Coriolis acceleration module 90, integrate direction-cosine module 92, and integrate body accelerations module 94 integrate their respective inputs over a same time duration, such as 0.5 seconds, 1.0 seconds, or other time durations. That is, integrate reference velocity module 88 integrates body-axis reference velocity vector $V_{ref}$ over the time duration using, e.g., trapezoidal integration or other numerical integration operations to produce integrated body-axis reference velocity vector $\Sigma V_{ref}$ that is provided to measurement matrix module 102. Integrate Coriolis acceleration module 90 determines an instantaneous Coriolis acceleration force experienced by accelerometers 24A-24C (FIG. 1) as a cross product of compensated and corrected body-axis angular rates $\omega_{comp-B}$ and body-axis reference velocity vector $V_{ref}$. Integrate Coriolis acceleration module 90 integrates the instantaneous Coriolis acceleration over the time duration (i.e., the same time duration utilized by integrate reference velocity module 88) to produce integrated Coriolis acceleration $\Sigma A_C$. Integrate direction-cosine module 92 integrates direction-cosine matrix C over the same time duration to produce integrated direction-cosine matrix $\Sigma C$. Integrate body accelerations module 94 integrates compensated and corrected body-axis accelerations $A_{comp-B}$ over the same time duration to produce integrated compensated and corrected body-axis accelerations $\Sigma A_{comp-B}$.

Accelerometer RMS module 84 receives compensated and corrected body-axis accelerations $A_{comp-B}$ and produces accelerations root mean square $A_{RMS}$ by computing a root mean square of the received acceleration compensated and corrected body-axis accelerations $A_{comp-B}$ or using other central tendency techniques. Rate gyroscopes RMS module 86 receives low-pass filtered compensated and corrected body-axis angular rates $\omega_{comp-B}$ from low pass filter 82 and produces angular rates root mean square $\omega_{RMS}$ by computing a root mean square of the received filtered compensated and corrected body-axis angular rates $\omega_{comp-B}$ or using other central tendency techniques.

Velocity boost factor module 96 receives low-pass filtered airspeed Va from low-pass filter 78 and produces velocity boost factor $K_V$ that is proportional to a rate of change of low-pass filtered airspeed Va with respect to time. That is, as the time rate of change of low-pass filtered airspeed Va increases, velocity boost factor $K_V$ increases. As the time rate of change of low-pass filtered airspeed Va decreases, velocity boost factor $K_V$ decreases. Similarly, accelerometer boost factor module 98 produces acceleration boost factor $K_A$ that is proportional to a time rate of change of accelerations root mean square $A_{RMS}$. Rate gyroscope boost factor module 100 produces angular rate boost factor $K_\omega$ that is proportional to a time rate of change of angular rates root mean square $\omega_{RMS}$.

Measurement matrix module 102, measurement vector module 104, state transition matrix module 106, process covariance noise matrix module 108, and measurement covariance noise matrix module 110 produce measurement matrix H, measurement vector y, state transition matrix $\phi$, process covariance noise matrix Q, and measurement covariance noise matrix R, respectively, which are utilized during execution of an extended Kalman filter implemented by Kalman filter module 112 to produce Kalman state vector X that includes tilt error correction values $\delta q$, Kalman accelerometer scale factor and bias error correction values $E_{K-A}$, and Kalman rate gyroscope scale factor and bias error correction values $E_{K-G}$. Measurement matrix module 102 utilizes integrated reference velocity $\Sigma V_{ref}$ and integrated direction-cosine matrix $\Sigma C$ to produce measurement matrix H. Measurement vector module 104 utilizes low-pass filtered body-axis reference velocity vector $V_{ref}$, integrated Coriolis acceleration $\Sigma A_C$, integrated direction-cosine matrix $\Sigma C$, and integrated compensated and corrected body-axis accelerations $\Sigma A_{comp-B}$ to generate measurement vector y. Measurement vector y represents a difference between a change in body-axis reference velocity vector $V_{ref}$ over a time duration and a change in integrated compensated and corrected body-axis accelerations $\Sigma A_{comp-B}$ over the same time duration with effects of integrated Coriolis acceleration $\Sigma A_C$ and gravity removed (e.g., added, subtracted, or otherwise removed). For example, measurement vector module 104 can add the integrated Coriolis acceleration $\Sigma A_C$ to the difference between the change in body-axis reference velocity vector $V_{ref}$ and integrated compensated and corrected body-axis accelerations $\Sigma A_{comp-B}$, and can subtract a value corresponding to the acceleration due to gravity (e.g., 9.8 meters/second/second) from the resulting sum.

State transition matrix module 106 utilizes integrated direction-cosine matrix $\Sigma C$ to populate state transition matrix $\phi$ utilized by Kalman filter module 112 to propagate the Kalman state forward in time. Process covariance noise matrix module 108 utilizes acceleration boost factor $K_A$ and angular rate boost factor $K_\omega$ to produce process noise covariance matrix Q that represents an estimate of uncertainty corresponding to process noise introduced by computational uncertainties or other process noise. Measurement covariance noise matrix module utilizes velocity boost factor $K_V$, acceleration boost factor $K_A$ and angular rate boost factor $K_\omega$ to produce measurement covariance noise matrix R that represents an estimate of uncertainty corresponding to sensor noise from accelerometers 24A-24C and rate gyroscopes 32A-32C (FIG. 1). Because each of velocity boost factor $K_V$, acceleration boost factor $K_A$ and angular rate boost factor $K_\omega$ are proportional to a rate of change of their respective inputs (i.e., low-pass filtered airspeed Va, accelerations root mean square $A_{RMS}$, and angular rates root mean square $\omega_{RMS}$), process covariance noise matrix module 108 and measurement covariance noise matrix module 110 effectively increase the effect of process covariance noise matrix Q and measurement covariance noise matrix R during execution of the extended Kalman filter implemented by Kalman filter module 112 during operational states corresponding to dynamic motion of IMU 10.

Kalman filter module 112 implements an extended Kalman filter that utilizes measurement matrix H, measurement vector y, state transition matrix $\phi$, process covariance matrix Q, and measurement covariance matrix R to produce Kalman state vector X. Kalman state vector X can be, e.g., a 16-element vector including (in any order): two tilt error correction values, one corresponding to pitch and the other corresponding to roll; three accelerometer bias error correction values, each corresponding to one of accelerometers 24A-24C; three accelerometer scale factor error correction values, each corresponding to one of accelerometers 24A-24C; three rate gyroscope bias error correction values, each corresponding to one of rate gyroscopes 32A-32C; three rate gyroscope scale factor error correction values, each corresponding to one of rate gyroscopes 32A-32C; and two transport rate error correction values corresponding to forward pitch rates experienced to maintain level flight while moving across the surface of the Earth.

Tilt correction module 114 utilizes the two tilt error correction values and the two transport rate error correction values to produce tilt error correction values $\delta q$, which are utilized by attitude determination module 20 during propagation of attitude quaternion $q^C$, as is further described above. Accelerometer bias and scale factor module 116 applies (e.g., adds, subtracts, or otherwise applies) the three accelerometer bias error correction values to accelerometer bias error correction values determined during a previous execution (e.g., a previous iteration) of Kalman estimator module 22 to produce three updated accelerometer bias error correction values, each corresponding to one of accelerometers 24A-24C. Similarly, accelerometer bias and scale factor module 116 applies (e.g., adds, subtracts, or otherwise applies) the three accelerometer scale factor error correction values to accelerometer scale factor error correction values determined during a previous execution (e.g., a previous iteration) of Kalman estimator module 22 to produce three updated accelerometer scale factor error correction values, each corresponding to one of accelerometers 24A-24C. Accelerometer bias and scale factor module 116 outputs the three updated accelerometer bias error correction values and the three updated accelerometer scale factor error correction values as Kalman accelerometer scale factor and bias error correction values $E_{K-A}$, which are received as input by inertial sensor compensation and correction module 18 and utilized during accelerometer error correction operations.

Rate gyroscope bias and scale factor module 118 applies (e.g., adds, subtracts, or otherwise applies) the three rate gyroscope bias error correction values of Kalman state vector X to rate gyroscope bias error correction values determined during a previous execution (e.g., a previous iteration) of Kalman estimator module 22 to produce three updated rate gyroscope bias error correction values, each corresponding to one of rate gyroscopes 32A-32C. Similarly, rate gyroscope bias and scale factor module 118 applies (e.g., adds, subtracts, or otherwise applies) the three rate gyroscope scale factor error correction values to rate gyroscope scale factor error correction values determined during a previous execution (e.g., a previous iteration) of Kalman estimator module 22 to produce three updated rate gyroscope scale factor error correction values, each corresponding to one of rate gyroscopes 32A-32C. Rate gyroscope bias and scale factor module 118 outputs the three updated rate gyroscope bias error correction values and the three updated rate gyroscope scale factor error correction values as Kalman rate gyroscope scale factor and bias error correction values $E_{K-G}$, which are received as input by inertial sensor compensation and correction module 18 and utilized during rate gyroscope error correction operations.

Accordingly, IMU 10 implementing Kalman estimator module 22, iteratively and adaptively determines scale factor and bias error correction values that are applied by inertial sensor compensation and correction module 18 to outputs of accelerometers 24A-24C and rate gyroscopes 32A-32C to produce error-compensated outputs body-axis angular rates 12 and body-axis accelerations 14. As such, Kalman estimator module 22 can help to correct body-axis angular rates 12 and body-axis accelerations 14 for non-deterministic errors that can be unpredictable in nature.

Figure 5:
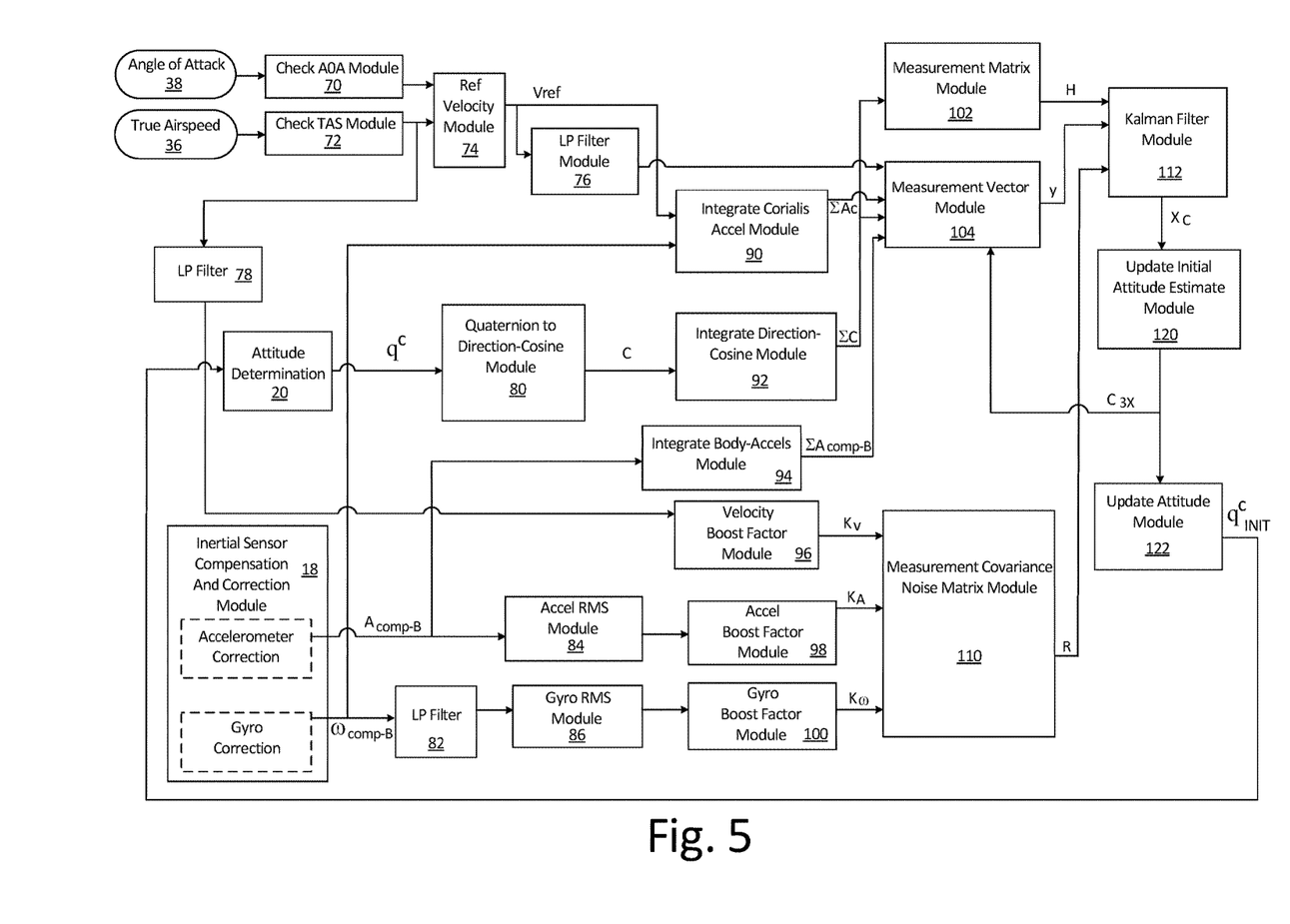
FIG. 5 is a schematic block diagram illustrating details of the Kalman estimator module of FIG. 1 to produce an initial attitude quaternion representing an initial attitude of the IMU.

FIG. 5 is a schematic block diagram illustrating details of Kalman estimator module 22 of FIG. 1 to produce initial attitude quaternion $q^C_{init}$ representing an initial attitude of IMU 10. That is, FIG. 5 illustrates details of Kalman estimator module 22 that are executed during an initialization phase of IMU 10, such as after initial power-up, reset, or other initialization phases. In general, many modules and operations of Kalman estimator module 22 described with respect to the example of FIG. 5 are substantially similar to the modules and operations of Kalman estimator module 22 that were described above with respect to FIG. 4. For purposes of clarity and ease of discussion, the same reference numbers are used for like modules, and only differences in modules and operations are described below with respect to the example of FIG. 5.

As illustrated in FIG. 5, Kalman estimator module 22 includes update initial attitude estimate module 120 and update attitude module 122, which are implemented by Kalman estimator module 22 during initialization operations. In the example of FIG. 5, measurement matrix module 102 receives integrated direction-cosine matrix ΣC from integrate direction-cosine module 92 and produces measurement matrix H, which is passed to Kalman filter module 112. Kalman filter module 112 receives measurement vector y, and measurement covariance matrix R as input and executes an extended Kalman filter to produce Kalman state vector $X_C$. Kalman state vector $X_C$ is a three-element vector, the three elements corresponding to error correction values of the third row (i.e., pitch and roll components) of integrated direction-cosine matrix ΣC. Kalman filter module 112 outputs state vector $X_C$ to update initial attitude estimate module 120, which applies (e.g., subtracts, adds, or otherwise applies) the error correction values from a previous execution (e.g., a previous iteration) of Kalman estimator module 22 to determine an updated initial attitude vector $C_{3X}$. Update initial attitude estimate module 120 outputs updated initial attitude vector $C_{3X}$ to measurement vector module 104, which applies (e.g., multiplies) updated initial attitude vector $C_{3X}$ to measurement vector y to produce an updated measurement vector y. Kalman estimator module 22 iteratively executes measurement vector module 104, Kalman filter module 112, and update initial attitude estimate module 120 for a threshold time duration, such as 10 seconds or other threshold time durations, to iteratively determine and modify updated initial attitude vector $C_{3X}$. Update initial attitude estimate module 120 provides updated initial attitude vector $C_{3X}$ to update attitude module 122, which converts the attitude information of initial attitude vector $C_{3X}$ to quaternion form and outputs initial attitude quaternion $q^C_{init}$ to attitude determination module 20 for use during initialization operations of IMU 10.

Accordingly, IMU 10 implementing techniques of this disclosure, utilizes air data parameter values, such as true airspeed and angle of attack, to produce error-corrected angular rate and acceleration output values. IMU 10 determines vehicle attitude in the form of attitude quaternion $q^C$ based on sensed acceleration and rotational position information received from accelerometers 24A-24C and gyroscopes 32A-32C. The air data parameter values are utilized by Kalman estimator module 22 to estimate sensor scale factor and bias errors that are provided as feedback to further adjust and correct the sensed output values of accelerometers 24A-24C and gyroscopes 32A-32C. Accordingly, the techniques described herein can increase an accuracy of outputs of IMU 10 (i.e., body-axis angular rates 12 and body-axis accelerations 14) by modifying the outputs to compensate for deterministic errors (e.g., temperature-dependent scale factor and bias errors, sensor non-linearity errors, and non-orthogonality errors) and correct for non-deterministic errors that can manifest as sensor scale factor and bias errors that arise during operation of (or between operations of) IMU 10.

Discussion of Possible Embodiments

The following are non-exclusive descriptions of possible embodiments of the present invention.

An inertial measurement unit includes an inertial sensor assembly, an inertial sensor compensation and correction module, and a Kalman estimator module. The inertial sensor assembly includes a plurality of accelerometers and a plurality of rate gyroscopes. Each of the plurality of accelerometers is configured to sense acceleration of the IMU along one of a plurality of axes. Each of the plurality of rate gyroscopes is configured to sense rotational rate of the IMU along one of the plurality of axes. The inertial sensor compensation and correction module is configured to apply a set of error compensation values to acceleration sensed by the plurality of accelerometers and to rotational rate sensed by the plurality of rate gyroscopes to produce a compensated acceleration and a compensated rotational rate of the IMU. The Kalman estimator module is configured to determine a change in integrated acceleration of the IMU over a time interval based on the compensated acceleration and the compensated rotational rate of the IMU, determine a set of error correction values based on a difference between the change in the integrated acceleration of the IMU and a change in true airspeed of the IMU, and provide the set of error correction values to the inertial sensor compensation and correction module. The inertial sensor compensation and correction module is further configured to apply the set of error correction values to each of the compensated acceleration and the compensated rotational rate to produce an error-corrected acceleration and an error-corrected rotation rate, and output the error-corrected acceleration and the error-corrected rotational rate.

The inertial measurement unit of the preceding paragraph can optionally include, additionally and/or alternatively, any one or more of the following features, configurations, operations and/or additional components:

The Kalman estimator module can be configured to determine the set of error correction values via an extended Kalman filter that utilizes the difference between the change in the integrated acceleration of the IMU and the change in the true airspeed of the IMU as input and produces the set of error correction values as output.

The inertial sensor assembly can further include a plurality of temperature sensors configured to sense temperature of an operating environment of the plurality of accelerometers and the plurality of rate gyroscopes. The set of error compensation values can include temperature-dependent error compensation values. The inertial sensor compensation and correction module can be configured to apply the set of error compensation values by determining the temperature-dependent error compensation values based on sensed temperature from each of the plurality of temperature sensors.

The temperature-dependent error compensation values can include temperature-dependent scale factor error compensation values, temperature-dependent bias error compensation values, and temperature-dependent non-linearity error compensation values for each of the plurality of accelerometers and each of the plurality of rate gyroscopes.

Each of the temperature-dependent scale factor error compensation values can correspond to an error in a slope of sensor output over a temperature range for a respective one of the plurality of accelerometers and the plurality of rate gyroscopes. Each of the temperature-dependent bias error compensation values can correspond to a non-zero offset error of sensor output over the temperature range for a respective one of the plurality of accelerometers and the plurality of rate gyroscopes. Each of the temperature-dependent non-linearity error compensation values can correspond to a non-linearity of the sensor output over the temperature range for a respective one of the plurality of accelerometers and the plurality of rate gyroscopes.

The set of error compensation values can include a non-orthogonality error compensation value corresponding to a non-orthogonality error of the plurality of axes.

The plurality of axes can include a first plurality of axes defining a sensor axis reference frame. The Kalman estimator module can be configured to determine the change in the integrated acceleration of the IMU by transforming the compensated acceleration from the sensor axis reference frame to a body axis reference frame defined by a second plurality of axes aligned with respect to a moving body that includes the IMU, and integrating the compensated acceleration in the body axis reference frame over the time interval.

The Kalman estimator module can be further configured to determine the set of error correction values by removing an effect of gravity from the difference between the change in the integrated acceleration of the IMU and the change in the true airspeed of the IMU.

The Kalman estimator module can be configured to remove the effect of gravity from the compensated acceleration by determining the effect of gravity based on mass attraction as a function of a radial distance between the IMU and a center of Earth.

The plurality of accelerometers can include three accelerometers. The plurality of rate gyroscopes can include three rate gyroscopes. The plurality of axes can include three axes.

Each of the three accelerometers can be aligned to sense the acceleration of the IMU along one of the three axes. Each of the three rate gyroscopes can be aligned to sense the rotational rate of the IMU along one of the three axes.

A method includes sensing acceleration of an inertial measurement unit (IMU) along a plurality of axes via a plurality of accelerometers of the IMU, and sensing rotational rate of the IMU along the plurality of axes via a plurality of rate gyroscopes of the IMU. The method further includes applying a set of error compensation values to each of the sensed acceleration and the sensed rotational rate to produce a compensated acceleration and a compensated rotational rate of the IMU, determining a change in integrated acceleration of the IMU over a time interval based on the compensated acceleration and the compensated rotational rate of the IMU, and determining a set of error correction values based on a difference between the change in the integrated acceleration of the IMU and a change in true airspeed of the IMU. The method further includes applying the set of error correction values to each of the compensated acceleration and the compensated rotational rate to produce an error-corrected acceleration and an error-corrected rotational rate, and outputting the error-corrected acceleration and the error-corrected rotational rate.

The method of the preceding paragraph can optionally include, additionally and/or alternatively, any one or more of the following features, configurations, operations and/or additional components:

Determining the set of error correction values can include determining the set of error correction values via an extended Kalman filter that utilizes the difference between the change in the integrated acceleration of the IMU and the change in the true airspeed of the IMU as input and produces the set of error correction values as output.

The method can further include sensing temperature of an operating environment of the plurality of accelerometers and the plurality of rate gyroscopes via a plurality of temperature sensors of the IMU. The set of error compensation values can include temperature-dependent error compensation values. Applying the set of error compensation values can include determining the temperature-dependent error compensation values based on the sensed temperature from each of the plurality of temperature sensors.

The temperature-dependent error compensation values can include temperature-dependent scale factor error compensation values, temperature-dependent bias error compensation values, and temperature-dependent non-linearity error compensation values for each of the plurality of accelerometers and each of the plurality of rate gyroscopes.

Each of the temperature-dependent scale factor error compensation values can correspond to an error in a slope of sensor output over a temperature range for a respective one of the plurality of accelerometers and the plurality of rate gyroscopes. Each of the temperature-dependent bias error compensation values can correspond to a non-zero offset error of sensor output over the temperature range for a respective one of the plurality of accelerometers and the plurality of rate gyroscopes. Each of the temperature-dependent non-linearity error compensation values can correspond to a non-linearity of the sensor output over the temperature range for a respective one of the plurality of accelerometers and the plurality of rate gyroscopes.

The set of error compensation values can include a non-orthogonality error compensation value corresponding to a non-orthogonality error of the plurality of axes.

The plurality of axes can include a first plurality of axes defining a sensor axis reference frame. Determining the change in the integrated acceleration of the IMU can include transforming the compensated acceleration from the sensor axis reference frame to a body axis reference frame defined by a second plurality of axes aligned with respect to a moving body that includes the IMU, and integrating the compensated acceleration in the body axis reference frame over the time interval.

Determining the change in the integrated acceleration of the IMU can further include removing an effect of gravity from the compensated acceleration prior to integrating the compensated acceleration in the body axis reference frame.

Removing the effect of gravity from the compensated acceleration can include determining the effect of gravity based on mass attraction as a function of a radial distance between the IMU and a center of Earth.

The plurality of accelerometers can include three accelerometers. The plurality of axes can include three axes. Each of the three accelerometers can be aligned to sense the acceleration of the IMU along one of the three axes. Each of the three rate gyroscopes can be aligned to sense the rotational rate of the IMU along one of the three axes.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An inertial measurement unit (IMU) comprising:
   an inertial sensor assembly comprising:
      a plurality of accelerometers, each of the plurality of accelerometers configured to sense acceleration of the IMU along one of a plurality of axes;
      a plurality of rate gyroscopes, each of the plurality of rate gyroscopes configured to sense rotational rate of the IMU along one of the plurality of axes; and
      a plurality of temperature sensors configured to sense temperature of an operating environment of the plurality of accelerometers and the plurality of rate gyroscopes;
   an inertial sensor compensation and correction module configured to apply a set of error compensation values to acceleration sensed by the plurality of accelerometers and to rotational rate sensed by the plurality of rate gyroscopes to produce a compensated acceleration and a compensated rotational rate of the IMU, wherein the set of error compensation values comprises temperature-dependent error compensation values, and wherein the inertial sensor compensation and correction module is configured to apply the set of error compensation values by determining the temperature-dependent error compensation values based on sensed temperature from each of the plurality of temperature sensors; and
   a Kalman estimator module configured to:
      determine a change in integrated acceleration of the IMU over a time interval based on the compensated acceleration and the compensated rotational rate of the IMU;
      determine a set of error correction values based on a difference between the change in the integrated acceleration of the IMU and a change in true airspeed of the IMU; and
      provide the set of error correction values to the inertial sensor compensation and correction module;
   wherein the inertial sensor compensation and correction module is further configured to:
      apply the set of error correction values to each of the compensated acceleration and the compensated rotational rate to produce an error-corrected acceleration and an error-corrected rotational rate; and
      output the error-corrected acceleration and the error-corrected rotational rate.

2. The IMU of claim 1,
   wherein the Kalman estimator module is configured to determine the set of error correction values via an extended Kalman filter that utilizes the difference between the change in the integrated acceleration of the IMU and the change in the true airspeed of the IMU as input and produces the set of error correction values as output.

3. The IMU of claim 1,
   wherein the temperature-dependent error compensation values comprise temperature-dependent scale factor error compensation values, temperature-dependent bias error compensation values, and temperature-dependent non-linearity error compensation values for each of the plurality of accelerometers and each of the plurality of rate gyroscopes.

4. The IMU of claim 3,
   wherein each of the temperature-dependent scale factor error compensation values corresponds to an error in a slope of sensor output over a temperature range for a respective one of the plurality of accelerometers and the plurality of rate gyroscopes;
   wherein each of the temperature-dependent bias error compensation values corresponds to a non-zero offset error of sensor output over the temperature range for a respective one of the plurality of accelerometers and the plurality of rate gyroscopes; and
   wherein each of the temperature-dependent non-linearity error compensation values corresponds to a non-linearity of the sensor output over the temperature range for a respective one of the plurality of accelerometers and the plurality of rate gyroscopes.

5. The IMU of claim 1,
   wherein the set of error compensation values comprises a non-orthogonality error compensation value corresponding to a non-orthogonality error of the plurality of axes.

6. The IMU of claim 1,
   wherein the plurality of axes comprises a first plurality of axes defining a sensor axis reference frame; and
   wherein the Kalman estimator module is configured to determine the change in the integrated acceleration of the IMU by:
      transforming the compensated acceleration from the sensor axis reference frame to a body axis reference frame defined by a second plurality of axes aligned with respect to a moving body that includes the IMU; and
      integrating the compensated acceleration in the body axis reference frame over the time interval.

7. The IMU of claim 1,
   wherein the Kalman estimator module is further configured to determine the set of error correction values by removing an effect of gravity from the difference between the change in the integrated acceleration of the IMU and the change in the true airspeed of the IMU.

8. The IMU of claim 1,
wherein the Kalman estimator module is further configured to determine the set of error correction values by removing an effect of Coriolis acceleration forces from the difference between the change in the integrated acceleration of the IMU and the change in the true airspeed of the IMU.

9. The IMU of claim 1,
wherein the plurality of accelerometers comprises three accelerometers;
wherein the plurality of rate gyroscopes comprises three rate gyroscopes;
wherein the plurality of axes comprises three axes;
wherein each of the three accelerometers is aligned to sense the acceleration of the IMU along one of the three axes; and
wherein each of the three rate gyroscopes is aligned to sense the rotational rate of the IMU along one of the three axes.

10. A method comprising:
sensing acceleration of an inertial measurement unit (IMU) along a plurality of axes via a plurality of accelerometers of the IMU;
sensing rotational rate of the IMU along the plurality of axes via a plurality of rate gyroscopes of the IMU;
sensing temperature of an operating environment of the plurality of accelerometers and the plurality of rate gyroscopes via a plurality of temperature sensors of the IMU;
applying a set of error compensation values to each of the sensed acceleration and the sensed rotational rate to produce a compensated acceleration and a compensated rotational rate of the IMU, wherein the set of error compensation values comprises temperature-dependent error compensation values, and wherein applying the set of error compensation values comprises determining the temperature-dependent error correction values based on the sensed temperature from each of the plurality of temperature sensors;
determining a change in integrated acceleration of the IMU over a time interval based on the compensated acceleration and the compensated rotational rate of the IMU;
determining a set of error correction values based on a difference between the change in the integrated acceleration of the IMU and a change in true airspeed of the IMU;
applying the set of error correction values to each of the compensated acceleration and the compensated rotational rate to produce an error-corrected acceleration and an error-corrected rotational rate; and
outputting the error-corrected acceleration and the error-corrected rotational rate.

11. The method of claim 10,
wherein determining the set of error correction values comprises determining the set of error correction values via an extended Kalman filter that utilizes the difference between the change in the integrated acceleration of the IMU and the change in the true airspeed of the IMU as input and produces the set of error correction values as output.

12. The method of claim 10,
wherein the temperature-dependent error compensation values comprise temperature-dependent scale factor error compensation values, temperature-dependent bias error compensation values, and temperature-dependent non-linearity error compensation values for each of the plurality of accelerometers and each of the plurality of rate gyroscopes.

13. The method of claim 12,
wherein each of the temperature-dependent scale factor error compensation values corresponds to an error in a slope of sensor output over a temperature range for a respective one of the plurality of accelerometers and the plurality of rate gyroscopes;
wherein each of the temperature-dependent bias error compensation values corresponds to a non-zero offset error of sensor output over the temperature range for a respective one of the plurality of accelerometers and the plurality of rate gyroscopes; and
wherein each of the temperature-dependent non-linearity error compensation values corresponds to a non-linearity of the sensor output over the temperature range for a respective one of the plurality of accelerometers and the plurality of rate gyroscopes.

14. The method of claim 10,
wherein the set of error compensation values comprises a non-orthogonality error compensation value corresponding to a non-orthogonality error of the plurality of axes.

15. The method of claim 10,
wherein the plurality of axes comprises a first plurality of axes defining a sensor axis reference frame; and
wherein determining the change in the integrated acceleration of the IMU comprises:
transforming the compensated acceleration from the sensor axis reference frame to a body axis reference frame defined by a second plurality of axes aligned with respect to a moving body that includes the IMU; and
integrating the compensated acceleration in the body axis reference frame over the time interval.

16. The method of claim 10,
wherein determining the set of error correction values comprises removing an effect of gravity from the difference between the change in the integrated acceleration of the IMU and the change in the true airspeed of the IMU.

17. The method of claim 10,
wherein determining the set of error correction values comprises removing an effect of Coriolis acceleration forces from the difference between the change in the integrated acceleration of the IMU and the change in the true airspeed of the IMU.

18. The method of claim 10,
wherein the plurality of accelerometers comprises three accelerometers;
wherein the plurality of rate gyroscopes comprises three rate gyroscopes;
wherein the plurality of axes comprises three axes;
wherein each of the three accelerometers is aligned to sense the acceleration of the IMU along one of the three axes; and
wherein each of the three rate gyroscopes is aligned to sense the rotational rate of the IMU along one of the three axes.

* * * * *